J. R. WEATHERLY.
COMBINED COTTON CHOPPER AND CULTIVATOR.
APPLICATION FILED JULY 21, 1913.

1,113,722.

Patented Oct. 13, 1914.
4 SHEETS—SHEET 1.

Witnesses
W. A. Williams
Lloyd W. Patch

Inventor
John R. Weatherly
By Lewis Bigger
his Attorneys

J. R. WEATHERLY.
COMBINED COTTON CHOPPER AND CULTIVATOR.
APPLICATION FILED JULY 21, 1913.

1,113,722.

Patented Oct. 13, 1914.
4 SHEETS—SHEET 2.

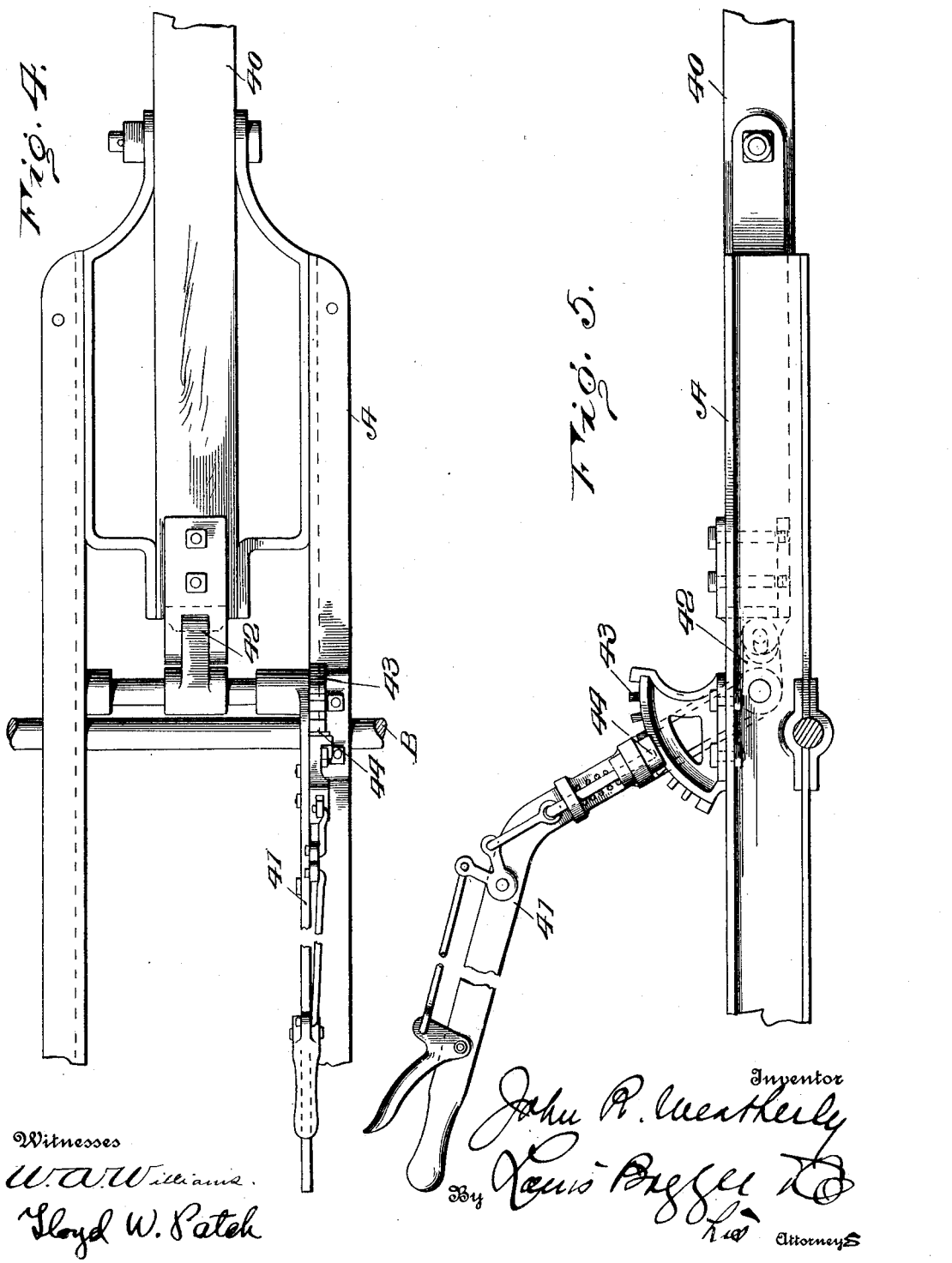

UNITED STATES PATENT OFFICE.

JOHN R. WEATHERLY, OF CHARLESTON, SOUTH CAROLINA, ASSIGNOR OF ONE-HALF TO ISADORE BLANK, OF CHARLESTON, SOUTH CAROLINA.

COMBINED COTTON CHOPPER AND CULTIVATOR.

1,113,722.  Specification of Letters Patent.  Patented Oct. 13, 1914.

Application filed July 21, 1913. Serial No. 780,334.

*To all whom it may concern:*

Be it known that I, JOHN R. WEATHERLY, a citizen of the United States, residing at Charleston, in the county of Charleston and State of South Carolina, have invented certain new and useful Improvements in Combined Cotton Choppers and Cultivators, of which the following is a specification.

My invention relates to an improvement in combined cotton choppers and cultivators.

The invention consists of certain novel features of construction and combinations of parts which will be hereinafter described and pointed out in the claims.

Figure 1:
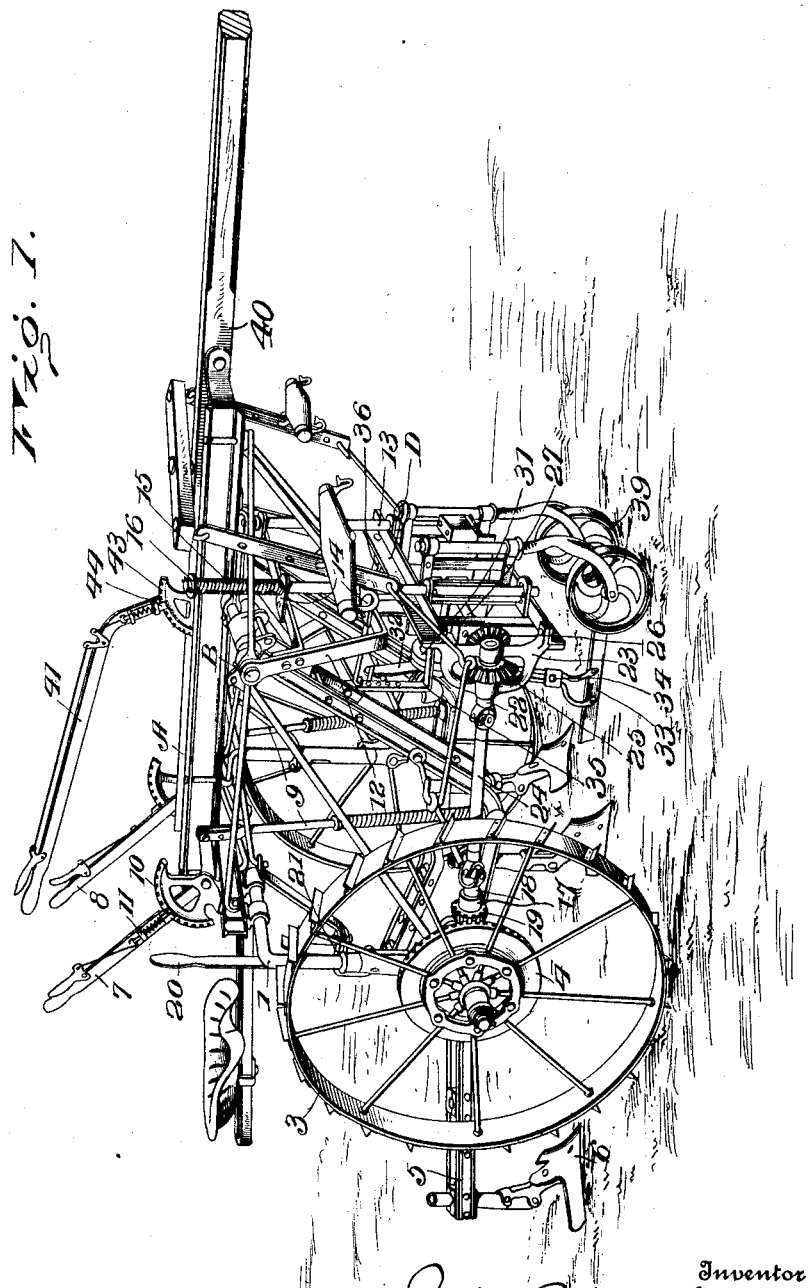
Figure 2:
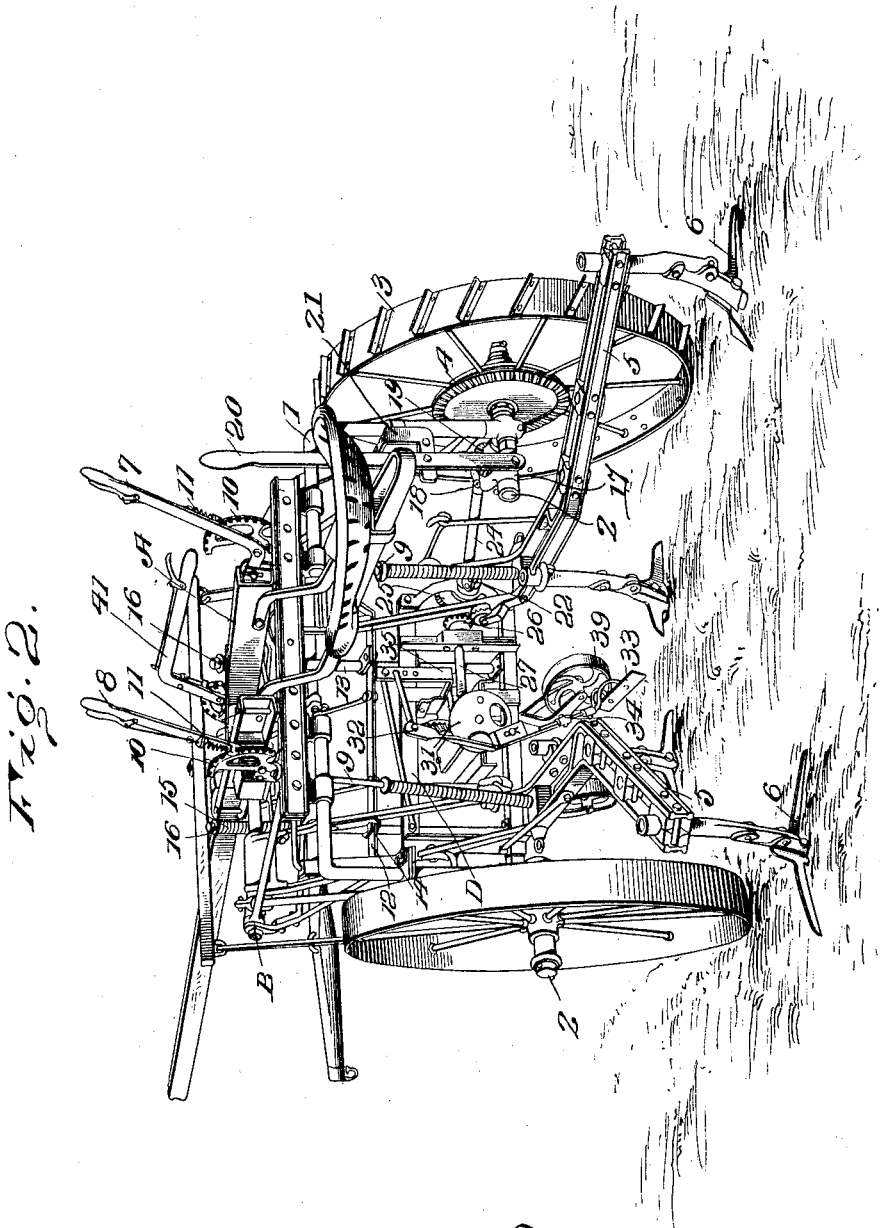
Figure 3:
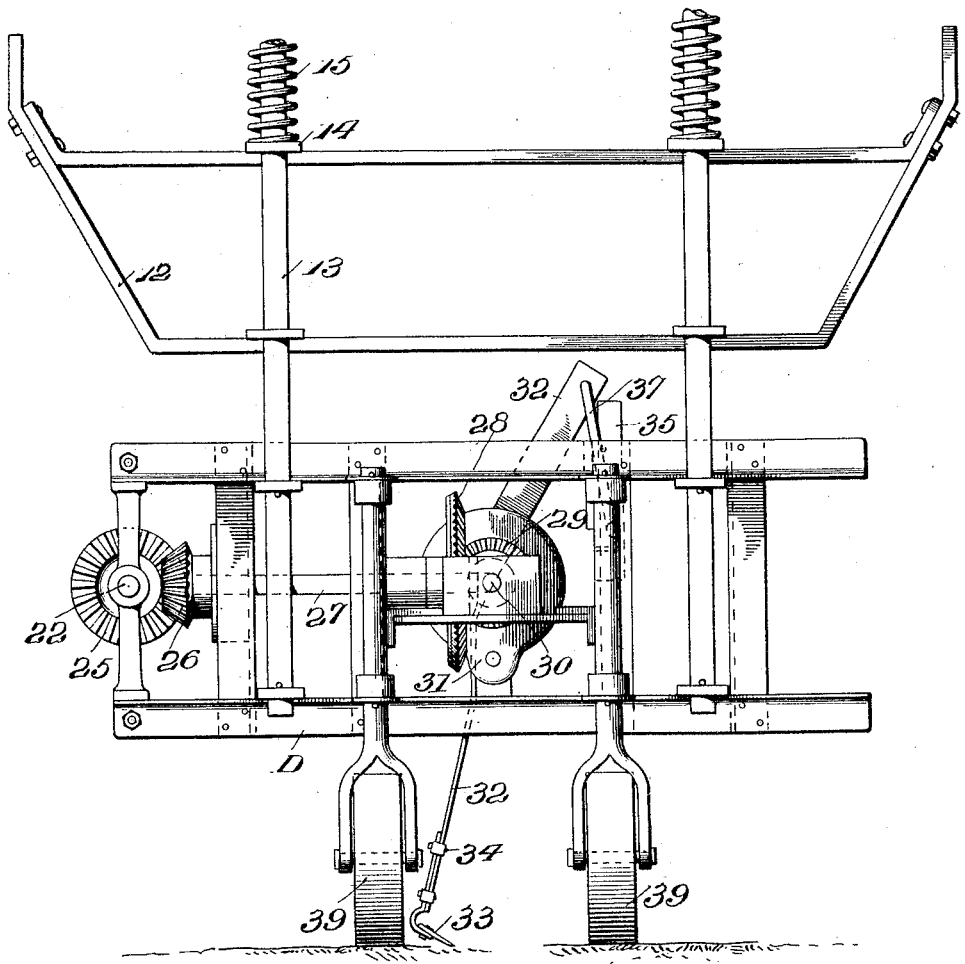

In the accompanying drawings: Figure 1 is a perspective view of the machine taken from the front of the machine; Fig. 2 is a rear perspective; Fig. 3 is a view in front elevation, showing the manner of mounting the cotton chopper frame; Fig. 4 is a top plan view showing in detail the manner of mounting the tongue; Fig. 5 is an enlarged detail view of the manner of operating the tongue.

A represents the frame of the machine, upon which two uprights 1, 1 are mounted. The uprights are connected to stub axles 2, 2 upon which wheels 3, 3 are mounted. Mounted upon one of the axles 2 is a beveled gear 4. The shaft B is mounted upon the frame and pivotally mounted upon the shaft are cultivator frames 5, 5, upon which are mounted the shoes 6, 6.

Levers 7 and 8 are mounted upon the frame A, and connected to each of the levers is a rod 9, which rods are connected to the frames 5, whereby the frames are capable of being raised or lowered upon the movement of the levers 7 and 8.

The lever 7 operates one of the frames, and the other lever operates the other. Segments 10 are mounted upon the frame 9, and the teeth of the segments are engaged by a pawl 11, mounted on each of the levers 7 and 8 for holding the frames 5 in their adjusted positions.

A yoke 12 is mounted upon the shaft B. The cotton chopper frame D is provided with two rods 13, which pass through brackets 14, 14 connected to the yoke 12. Helical springs 15 are mounted upon the rods 13, and are held between the uppermost brackets 14 on the yoke 12 and washers 16 on the rods 13.

A hanger 17 is slidably mounted upon one of the stub axles 2, and journaled in the hanger is a stub shaft 18. Mounted upon the stub shaft 18 is a pinion 19, which is adapted to be thrown into engagement with the beveled gear 4.

A lever 20 is pivotally mounted upon a bracket 21, carried by one of the standards 1. The lever 20 is connected to the hanger 17, and by oscillating the lever, the hanger is moved along the stub axle 2 to cause the pinion 19 to be brought into engagement with the beveled gear 4.

A jack shaft 22 is journaled in a yoke 23 mounted on the cotton chopper frame D. The shaft 24 has swiveled connection with the stub shaft 18, and the jack shaft 22, so that the jack shaft is caused to rotate upon the rotation of the stub shaft 18, and permits power being transmitted to the jack shaft at all times, regardless of the angle or position taken by the cotton chopper frame due to the uneven surface over which it is traveling.

A beveled pinion 25 is mounted on the jack shaft and meshes with the beveled pinion 26 on the shaft 27 carried by the cotton chopper frame D. A beveled gear 28 is mounted on the shaft 27, and meshes with the pinion 29 carried on the shaft 30, which shaft is journaled on the frame D and at right angles to the shaft 27.

Mounted upon the shaft 30 is a disk 31, to which disk a handle 32 is eccentrically mounted. The handle 32 is mounted about midway of its length upon the disk 31, and carried at the lower end thereof is the hoe or blade 33, the hoe being adjustably connected to the handle by means of brackets 34. An angular bracket 35 is mounted upon the frame D, and a brace rod 36 is connected to the upper end of the bracket and to the frame D for holding the bracket in a rigid position.

The upper end of the handle 32 extends at an oblique angle from its connection with the eccentric disk 31, and the upper end of the handle 32 is connected to the bracket 35 by means of a link 37. The bracket 35 is provided with a plurality of openings 38, whereby the link 37 is capable of being adjusted for governing the stroke of the hoe 33.

Connected to the forward end of the frame D are two wheels 39, 39, which support the frame D at the desired elevation, and the springs 15 afford a resilient support for the frame, and take up any vibration which may be imparted to the frame through the wheels 39 as the machine is drawn across the field. With the cotton chopper frame mounted in this manner, the blade or hoe will always operate properly, as it will accommodate itself to the inequalities of the ground.

Pivotally mounted upon the frame is the tongue 40. A lever 41 is pivotally mounted upon the frame and is connected to the one end of the tongue by means of a link 42. A rack segment 43 is mounted upon the frame, which is engaged by a pawl 44 for holding the lever 41 in its adjusted positions for changing the angle of the tongue. This movement of the tongue or pole up and down regulates the depth of penetration of the plows and also causes all of the parts of the machine which come in contact with the ground to assume a level position.

Having fully described my invention, what I claim as new and desire to secure by Letters Patent is:

1. In a combined cotton chopper and cultivator, the combination with a wheel frame, of a shaft mounted on the frame, a cultivator frame loosely mounted upon the shaft, a cotton chopper frame resiliently supported from said shaft, a pole pivoted to the frame, a lever pivoted to the wheel frame, and means connected to the lever having a loose connection with the pole whereby upon the actuation of the lever the pole is operated for regulating the depth of penetration of the cultivator plows, and maintaining the parts which come in contact with the soil in a level position.

2. In a combined cotton chopper and cultivator, the combination with a wheeled frame, of a shaft mounted on the frame, a cultivator frame loosely mounted upon the shaft, a yoke connected to the shaft, a cotton chopper frame resiliently supported on said yoke, a pole pivoted to the frame, and means for actuating the pole for regulating the depth of penetration of the cultivator plows and maintaining the parts which come in contact with the soil in a level position.

3. The combination with a frame having wheels, of a yoke connected thereto, a cotton chopper frame resiliently supported on the yoke, a shaft mounted on said cotton chopper frame, a cotton chopper eccentrically and adjustably mounted on said shaft, means for transmitting motion to said shaft from one of the wheels, and wheels connected to the cotton chopper frame for automatically moving the frame by the unevenness of the soil for insuring the proper depth of cut of the chopper.

In testimony whereof I affix my signature, in the presence of two witnesses.

JOHN R. WEATHERLY.

Witnesses:
J. MONSERRAD,
M. HOLLING.